US007731234B2

(12) United States Patent
Adler et al.

(10) Patent No.: US 7,731,234 B2
(45) Date of Patent: Jun. 8, 2010

(54) AIR BAG MODULE WITH DIFFUSER

(75) Inventors: Angelo J. Adler, Washington, MI (US); Douglas M. Gould, Lake Orion, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 266 days.

(21) Appl. No.: 11/714,511

(22) Filed: Mar. 6, 2007

(65) Prior Publication Data

US 2008/0217891 A1 Sep. 11, 2008

(51) Int. Cl.
*B60R 21/26* (2006.01)
*B60R 21/217* (2006.01)
*B60R 21/215* (2006.01)

(52) U.S. Cl. .................... 280/740; 280/742; 280/728.2; 280/728.3

(58) Field of Classification Search ............. 280/728.2, 280/728.3, 740, 742
See application file for complete search history.

(56) References Cited

U.S. PATENT DOCUMENTS 3,602,526 A * 8/1971 Brawn ........................ 280/740
3,791,671 A * 2/1974 Zens .......................... 280/740
4,944,527 A 7/1990 Bishop et al.
5,340,147 A * 8/1994 Fontecchio et al. ...... 280/728.2
5,470,105 A 11/1995 Rose et al.
5,520,415 A 5/1996 Lewis et al.
5,582,428 A * 12/1996 Buchanan et al. ........... 280/741
5,605,347 A 2/1997 Karlow et al.
5,613,704 A 3/1997 White, Jr. et al.
5,709,402 A * 1/1998 Leonard .................. 280/728.2
5,732,971 A 3/1998 Lutz
5,775,730 A 7/1998 Pripps et al.
5,788,269 A 8/1998 Jakovski et al.
5,934,700 A 8/1999 Disam et al.
6,161,862 A * 12/2000 Rose et al. ............... 280/728.2
6,161,865 A * 12/2000 Rose et al. ............... 280/728.3
6,193,269 B1 * 2/2001 Amamori ................. 280/728.2

(Continued)

FOREIGN PATENT DOCUMENTS

JP 4101 38854 A * 5/1998

(Continued)

OTHER PUBLICATIONS

Article 40729 "Gas Flow Filter/Diffuser", published in Research Disclosure, Mar. 1998, No. 407.

*Primary Examiner*—Paul N. Dickson
*Assistant Examiner*—George D. Spisich
(74) *Attorney, Agent, or Firm*—Tarolli, Sundheim, Covell & Tummino LLP

(57) ABSTRACT

An apparatus (10) helps to protect an occupant of a vehicle. The apparatus (10) includes an inflatable vehicle occupant protection device (14), an inflation fluid source (26), and a diffuser plate (200). The inflation fluid source (26) provides inflation fluid for inflating the inflatable vehicle occupant protection device (14). The diffuser plate (200) is disposed between the inflation fluid source (26) and the inflatable vehicle occupant protection device (14). The diffuser plate (200) includes a main body portion (210) and a plurality of raised portions (230). The raised portions (230) define slots (232) for allowing inflation fluid to flow from the inflation fluid source (26) to the inflatable vehicle occupant protection device (14).

20 Claims, 5 Drawing Sheets

60
14
200
26
20
70

U.S. PATENT DOCUMENTS

| | | | | |
|---|---|---|---|---|
| 6,325,407 | B1 * | 12/2001 | Soderquist | 280/728.2 |
| 6,336,659 | B1 | 1/2002 | Corrion | |
| 6,595,547 | B2 * | 7/2003 | Smith | 280/736 |
| 6,837,513 | B2 * | 1/2005 | Oka et al. | 280/728.2 |
| 7,364,191 | B2 * | 4/2008 | Siegel et al. | 280/736 |
| 7,431,327 | B2 * | 10/2008 | Kretzschmar et al. | 280/728.2 |
| 2003/0173760 | A1 | 9/2003 | Dillon et al. | |
| 2004/0100071 | A1 * | 5/2004 | Chavez et al. | 280/728.2 |
| 2004/0222621 | A1 * | 11/2004 | Thomas | 280/740 |
| 2005/0082793 | A1 * | 4/2005 | Lee | 280/728.2 |

FOREIGN PATENT DOCUMENTS

| | | | |
|---|---|---|---|
| JP | 2001-277979 | * | 10/2001 |
| WO | WO 03/033311 | * | 4/2003 |

* cited by examiner 60
14
200

26
20
70

10
200
220
222
224
230
232
234
210

AIR BAG MODULE WITH DIFFUSER

TECHNICAL FIELD

The present invention relates to an apparatus for controlling flow of inflation fluid in an air bag module. More specifically, the present invention relates to an apparatus for reducing the amount of heat and/or solid particulates released toward an air bag during inflation of the air bag.

BACKGROUND OF THE INVENTION

An inflatable vehicle occupant protection device, such as an air bag, is deployed upon the occurrence of a vehicle collision. The air bag is part of a conventional vehicle occupant protection apparatus that includes a collision sensor and an inflator. The inflator includes a housing and an inflation fluid source in the housing. Upon sensing the occurrence of an event for which inflation of the air bag is desired, the inflator is actuated and emits inflation fluid under pressure in the inflator housing. The pressurized inflation fluid is directed out of the inflator housing and inflates the air bag into the vehicle occupant compartment to help protect the vehicle occupants.

Inflators can generate heat and particulates during deployment. Conventional methods of controlling these products include adding fabric to the air bag, coating the air bag fabric, providing filter screens, adding metal protection plates around the air bag, or a combination of these methods.

SUMMARY OF THE INVENTION

The present invention relates to an apparatus for helping to protect an occupant of a vehicle. The apparatus includes an inflatable vehicle occupant protection device, an inflation fluid source, and a diffuser plate. The inflation fluid source provides inflation fluid for inflating the inflatable vehicle occupant protection device. The diffuser plate is disposed between the inflation fluid source and the inflatable vehicle occupant protection device. The diffuser plate includes a semi-cylindrical main body portion and a plurality of raised portions. Each raised portion defines two curved slots for allowing inflation fluid to flow from the inflation fluid source to the inflatable vehicle occupant protection device.

The present invention also relates to another apparatus for helping to protect an occupant of a vehicle. The apparatus includes a diffuser plate and an inflation fluid source. The inflation fluid source provides a flow of inflation fluid toward the diffuser plate. The diffuser plate includes a main body portion and a plurality of raised portions. Each raised portion defines two curved slots for allowing inflation fluid to flow from the inflation fluid source through the diffuser plate to an inflatable vehicle occupant protection device.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
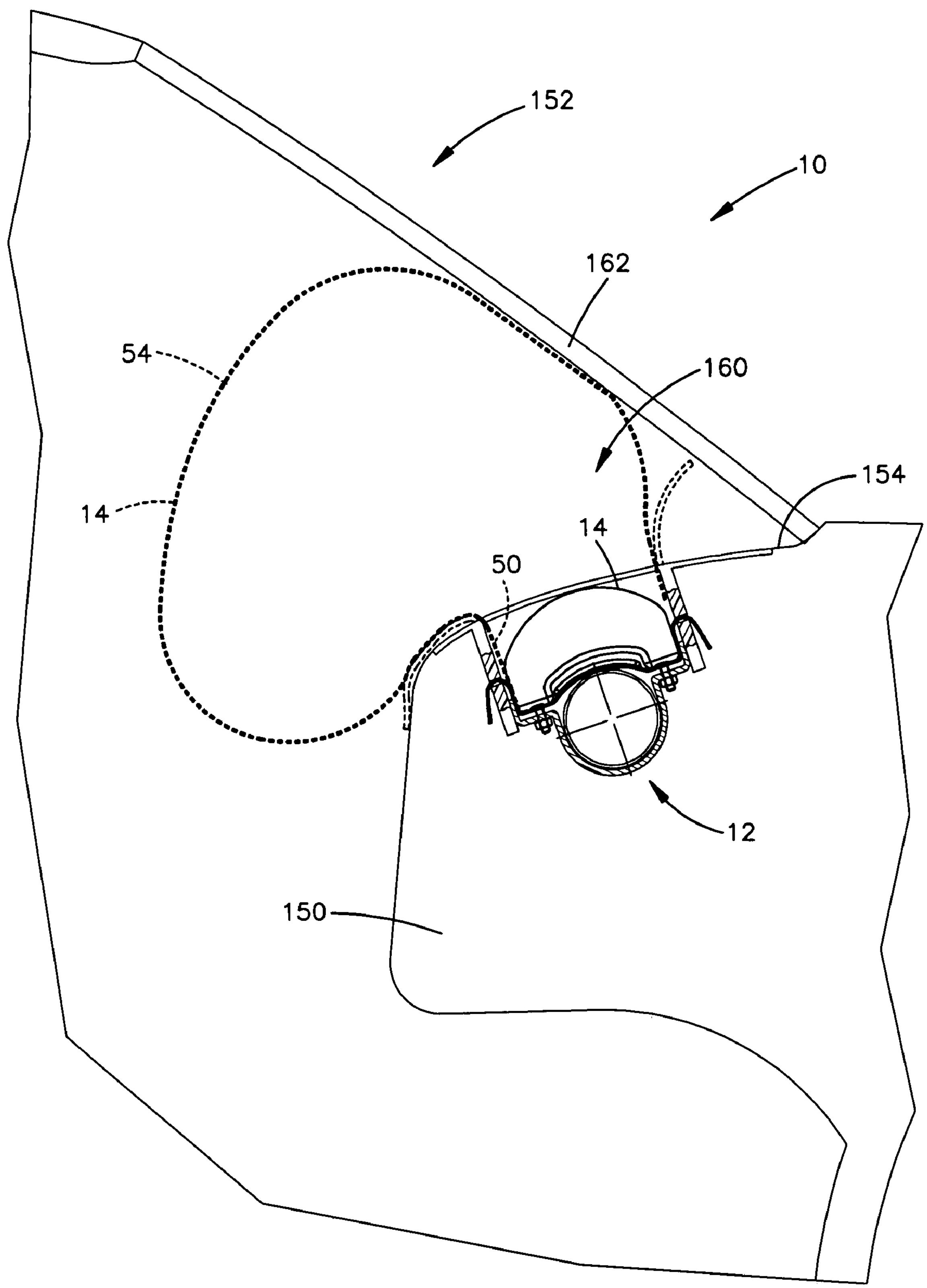
FIG. 1 is a schematic section view of an apparatus in accordance with the present invention.

The present invention relates to an apparatus for helping to protect an occupant of a vehicle. Referring to FIG. 1, the vehicle occupant protection apparatus 10 comprises an air bag module 12. The air bag module 12 of FIG. 1 is a frontal air bag module configured to be mounted in an instrument panel 150 on a passenger side of a vehicle 152. Alternatively, the air bag module 12 could, for example, be mounted on a steering wheel (not shown) of the vehicle 152.

The air bag module 12 includes an air bag 14 inflatable from a stored condition (FIG. 1) to a deployed condition (FIG. 1 in phantom). In the stored condition, the air bag 14 is folded, rolled, or otherwise packaged and placed in a housing 20. In the illustrated embodiment, the housing 20 comprises a reaction canister 22 configured to be mounted in the instrument panel 150 (FIG. 1) of the vehicle 152. The reaction canister 22 includes an opening 24 in which the air bag 14 is located in the stored condition.

The air bag module 12 also includes an inflation fluid source in the form of an inflator 26 that is actuatable to provide inflation fluid for inflating the air bag 14. The inflator 26 is located in the reaction canister 22 and supported by the reaction canister. The inflator 26 may be of any suitable construction or configuration. For example, the inflator 26 may contain a stored quantity of pressurized inflation fluid (not shown) in the form of a gas for inflating the air bag 14. As another example, the inflator 26 may contain a combination of pressurized inflation fluid and ignitable material for heating the inflation fluid (known as a "hybrid" inflator) or may be a pyrotechnic inflator that uses the combustion of gas-generating material to generate inflation fluid. As a further example, the inflator 26 may be of any suitable type or construction for supplying a medium for providing inflation fluid to inflate the air bag 14.

The air bag module 12 also includes a cover 60 that covers the opening 24 of the reaction canister 22 and thus helps form the housing 20. As shown schematically in FIG. 3, the cover 60 has flange portions 62 that cooperate with the reaction canister 22 to secure the cover to the reaction canister. The cover 60 is placed in an open condition by forces exerted by the inflating air bag 14. This enables the air bag 14 to deploy through the cover 60. For example, the cover 60 may include a tear seam (not shown) that ruptures to place the cover in the open condition. As another example, the cover 60 may be adapted to release from the air bag module 12 and pivot or otherwise move away from the air bag module to place the cover in the open condition.

The reaction canister 22 has a main body portion 30 that includes a semi-cylindrical rear wall 34, first and second side walls 36, and walls 38 (one shown in FIG. 2) connecting the first and second side walls. The reaction canister 22 also includes a generally rectangular retainer portion 40 that extends from the main body portion 30. The retainer portion 40 includes a flange portion 42 that extends transversely and outwardly (e.g., generally perpendicularly) from ends of the side walls 36 opposite the rear wall 34. The retainer portion 40 also includes a peripheral rim portion 44 that extends from an edge of the flange portion 42 away from the main body portion 30.

Figure 2:
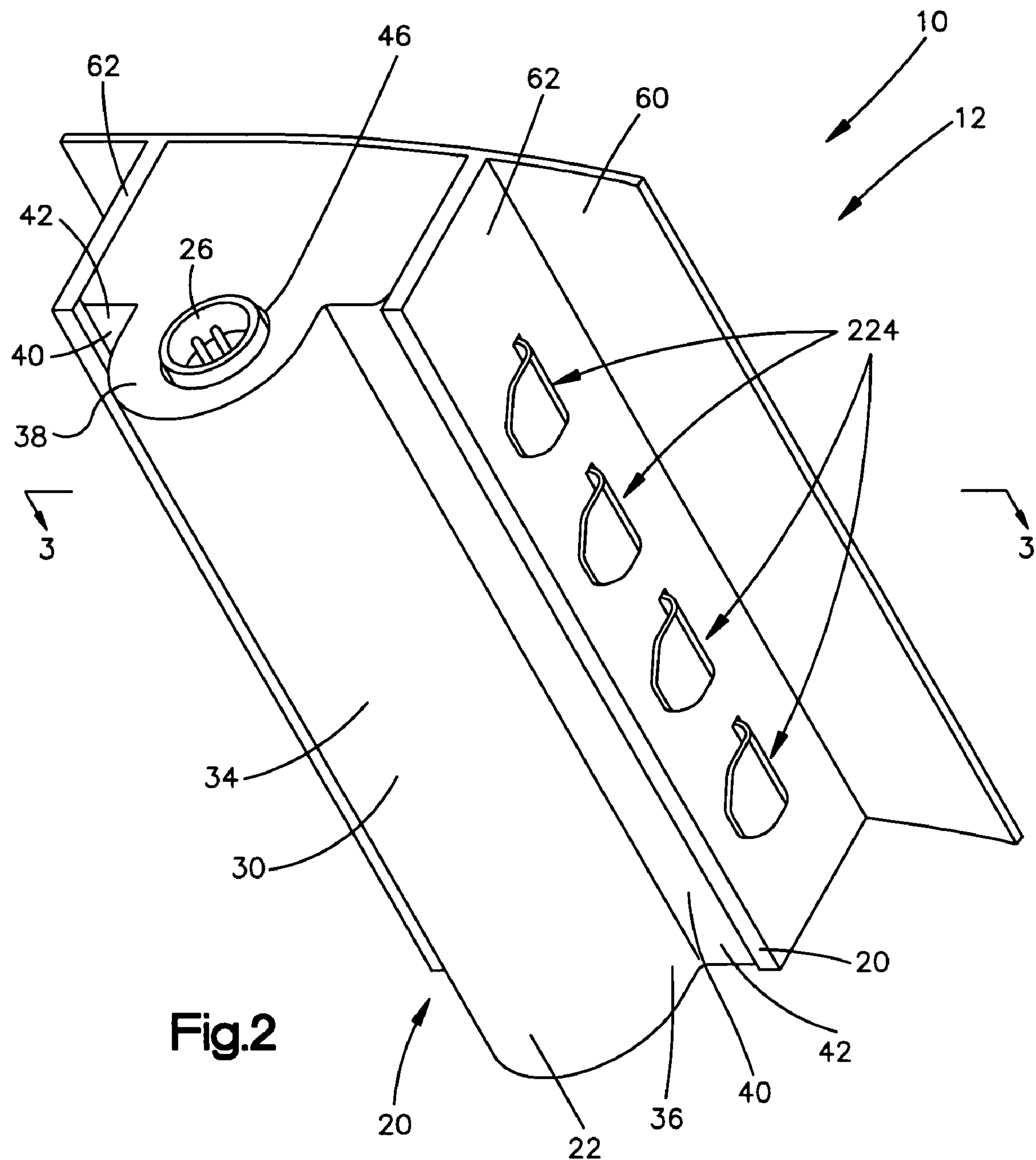
FIG. 2 is a schematic perspective view of the apparatus of FIG. 1.
Figure 3:
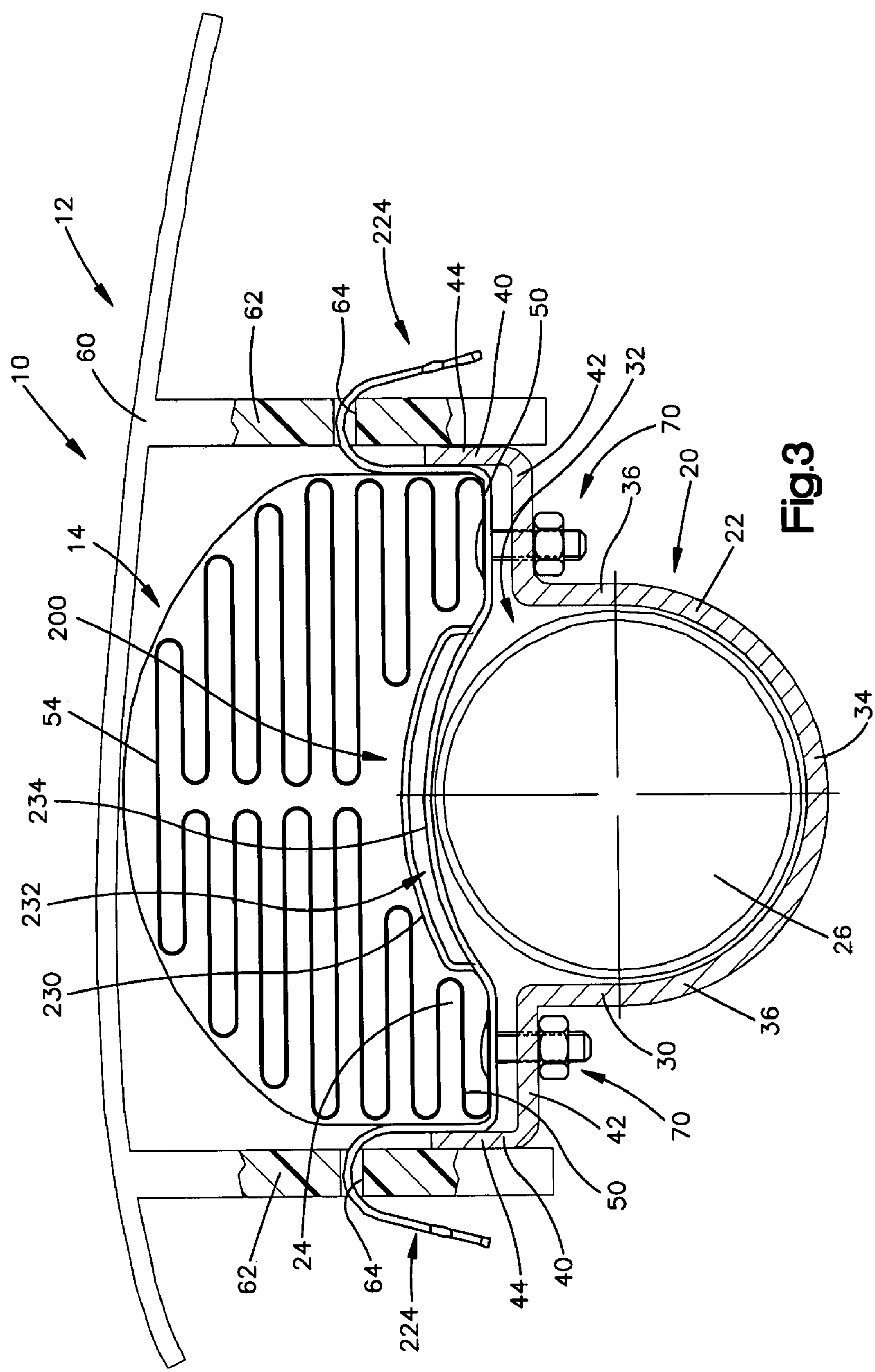
FIG. 3 is a schematic section view taken along line 3-3 in FIG. 2.
Figure 4:
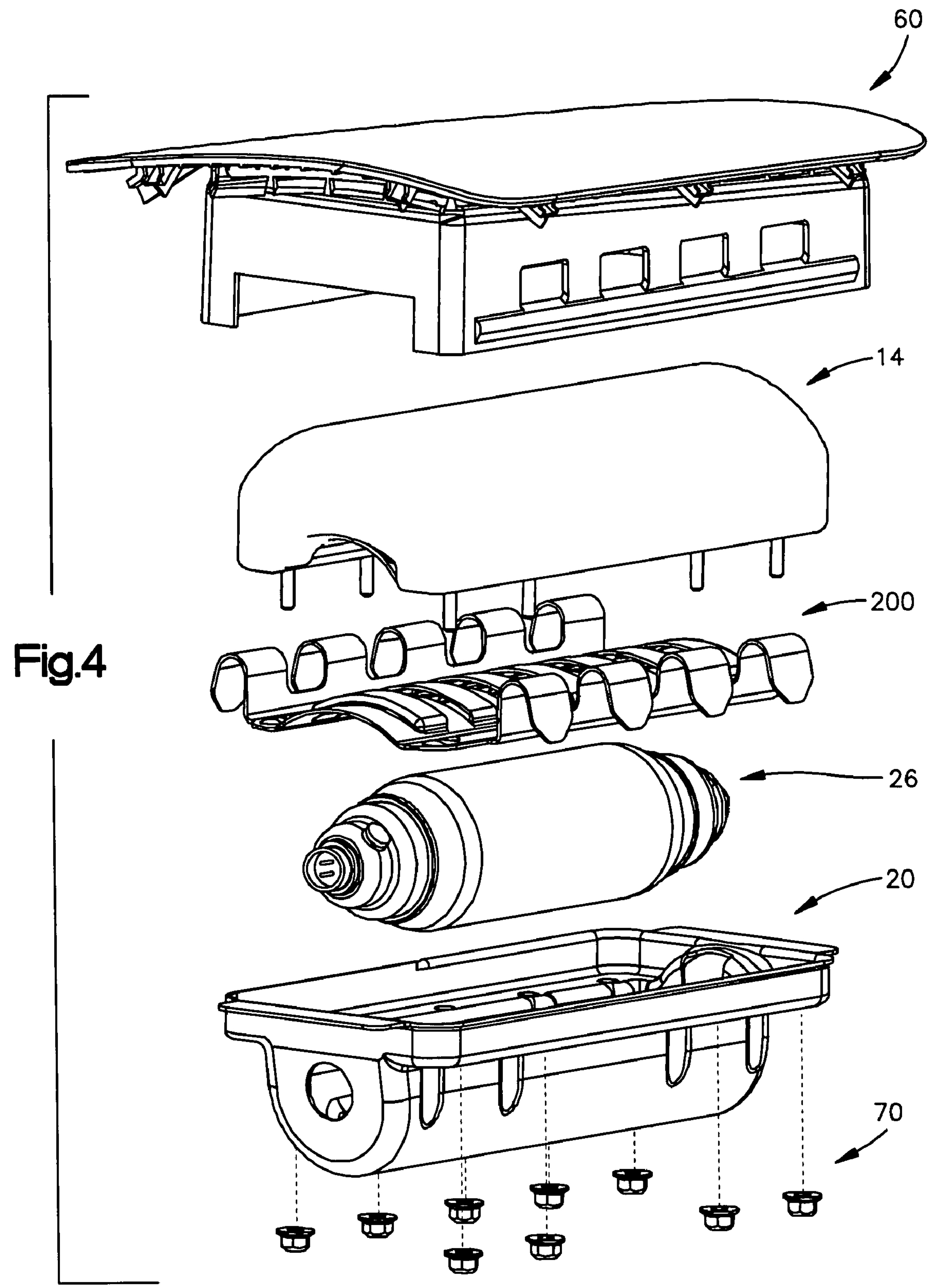
FIG. 4 is an exploded schematic perspective view of the apparatus of FIG. 2.

The flange portion 42 and rim portion 44 of the retainer portion 40 help define the opening 24. The main body portion 30 and retainer portion 40 help define a chamber 32 of the reaction canister 22 in which the inflator 26 is supported. As shown in FIG. 2, the walls 38 may include means 46, such as a surface that defines an opening in an end wall, for further helping to support one end of the inflator 26. As shown in FIGS. 3 and 4, the chamber 32 also receives at least a portion of the air bag 14 when deflated and folded in the stored condition.

A mouth portion 50 (FIG. 1) of the air bag 14 and a retainer plate (not shown) internal to the air bag are secured to the retainer portion 40 of the reaction canister 22 along with a diffuser plate 200. The diffuser plate 200 is configured for being seated in and connected to the retainer portion 40 of the reaction canister 22 in a known manner, such as via threaded fastener assemblies 70 or a snap fit connection (not shown). In the assembled condition of FIG. 3, the mouth portion 50 of the air bag 14 and the internal retainer plate are also secured to the retainer portion 40 and diffuser plate 200 by the fastener assemblies 70 or snap fit connections, thus securely connecting the air bag 14 to the reaction canister 22.

The mouth portion 50 defines an inflation fluid opening in the air bag 14 for receiving inflation fluid from the inflator 26. Opposite the mouth portion 50, the air bag 14 includes an outer portion or panel 54 (FIG. 1) that is presented toward a vehicle occupant (not shown) when the air bag is inflated. In the stored condition, the air bag 14 is folded so that the outer panel 54 is located proximate the cover 60 (FIG. 3). During inflation of the air bag 14, the outer panel 54 moves away from the reaction canister 22 as described below.

The diffuser plate 200 has a generally rectangular shape configured to mate with or conform to the generally rectangular retainer portion 40 of the reaction canister 22. Other suitable shapes to conform to various air bag modules may also be utilized. The diffuser plate 200 may have any suitable construction, such as a stamped sheet metal construction or a plastic (e.g., injection molded) construction.

Figure 5:
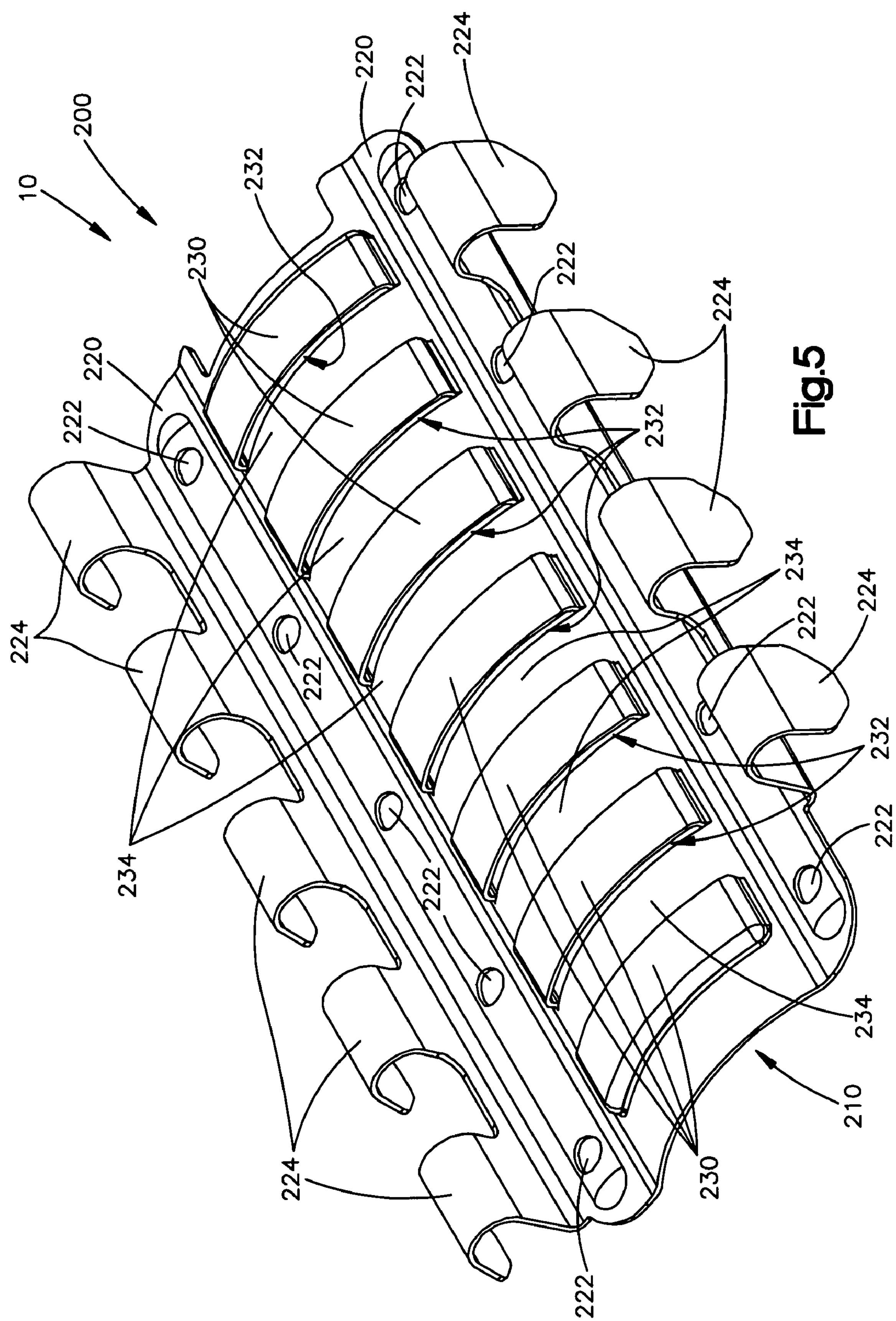
FIG. 5 is a schematic perspective view of part of the apparatus of FIG. 4.

As shown in FIG. 5, the rectangular diffuser plate 200 includes a curved, or semi-cylindrical, main body portion 210 that extends away from the inflator 26. Two planar flange portions 220 extend oppositely outward away from the main body portion 210. Each flange portion 220 includes several openings 222 for receiving the fastener assemblies 70. Each flange portion 220 further includes tabs 224 extending upward from the flange portion. The tabs 224 extend upward away from the reaction canister 22 and curve back downward toward the reaction canister. In the illustrated embodiment, the tabs 224 extend generally 90 degrees upward from each flange portion 220 away from the reaction canister 22 and curve approximately 150 degrees back downward toward the reaction canister. As shown in FIGS. 3 and 4, this configuration of the tabs 224 allows the tabs to extend through openings 64 in the flange portions 62 of the cover 60 in order to help secure the cover to the reaction canister 22.

The curved main body portion 210 of the diffuser plate 200 includes several curved raised portions 230 extending upward from unraised portions 234 of the main body portion. Each raised portion 230 includes end portions extending away from unraised portions 234 of the main body portion 210 and a connecting middle portion curved similarly to the main body portion 210 (FIG. 3). The main body portion 210 and the middle portion of the raised portions 230 have a predetermined radius of curvature, which is the same for both the main body portion and the middle portion of the raised portions.

The raised portions 230 form louvers that block a linear flow of inflation fluid from the inflator 26 to the mouth portion 50 of the air bag 14. Instead, inflation fluid strikes the diffuser plate 200 and is directed transversely through curved slots 232 defined by the raised portions 230 and unraised portions 234 of the main body portion, and then into the air bag 14.

Upon the occurrence of an event for which inflation of the air bag 14 is desired, the inflator 26 is actuated in a known manner to direct inflation fluid through the diffuser plate 200 into the air bag 14. In response to receiving inflation fluid, the air bag 14 inflates and deploys from a stored condition (FIG. 1) through the cover 60 away from the instrument panel 152 to a deployed condition (FIG. 1 in phantom).

In FIG. 1, the air bag module 12 is illustrated installed in an instrument panel 150 of a vehicle 152 in what is referred to as a top-mount installation. By "top-mount," it is meant that the air bag module 12 is installed in the instrument panel 150 with the opening 24 presented facing in a generally upward direction in the vehicle 152 toward a top or upper surface 154 of the instrument panel. In the stored condition of FIG. 1, the cover 60 may thus be flush with the upper surface 154 and may form or otherwise define a portion of the upper surface. The air bag module 12 may, however, be configured to be installed in other suitable ways. For example, the air bag module 12 may be configured for a mid-mount installation in which the module is installed in the instrument panel with the opening 24 presented facing generally rearward in the vehicle toward the occupant compartment.

As the inflator 26 discharges inflation fluid into the air bag 14, the cover 60 opens and the air bag begins to inflate and deploy in a generally upward direction into a space 160 defined between the instrument panel 150 and a windshield 162 of the vehicle 152 (FIG. 1). As the air bag 14 continues to inflate and deploy, the air bag engages the windshield 162 and is deflected or otherwise directed to deploy rearward in the vehicle 152 away from the windshield (FIG. 1).

Typical pyrotechnic and/or hybrid inflators require filters to help remove particulates and dissipate heat from the inflation fluid. The diffuser plate 200 also dissipates heat and helps remove particulates from the inflation fluid. With implementation of the diffuser plate 200, inflator filters may be reduced in size or eliminated.

Specifically, the diffuser plate 200 performs as a heat shield and diffuser that requires inflation fluid to follow a tortuous path through the slots 232 while being delivered to the air bag 14. Heat from the inflation fluid is absorbed and conducted away from the attachment area of the mouth portion 50 of the air bag 14 to the reaction canister 22 by the diffuser plate 200. This helps reduce or eliminate the need for separate filters (e.g., wire mesh or expanded metal) typically used for performing this function. Any particulates released from the inflator 26 strike the diffuser plate 200. The diffuser plate 200 also allows the use of uncoated air bag materials, since the diffuser plate helps reduce the temperature of high speed particulates in inflation fluid that contacts the air bag.

From the above description of the invention, those skilled in the art will perceive improvements, changes, and modifications. Such improvements, changes, and modifications within the skill of the art are intended to be covered by the appended claims.

Having described the invention, the following is claimed:

1. An apparatus for helping to protect an occupant of a vehicle, said apparatus comprising:

an inflatable vehicle occupant protection device;

an inflation fluid source extending along an axis and providing inflation fluid for inflating said inflatable vehicle occupant protection device; and a diffuser plate disposed between said inflation fluid source and said inflatable vehicle occupant protection device, said diffuser plate including a main body portion and a plurality of raised portions defining slots between the main portion and the raised portions, inflation fluid flowing from said inflation fluid source through said slots and being deflected by said diffuser plate along a plane substantially parallel to said axis of said inflation fluid source and into said inflatable vehicle occupant protection device.

2. The apparatus as set forth in claim 1 wherein said diffuser plate is constructed from a single piece of sheet metal by a stamping process.

3. The apparatus as set forth in claim 1 wherein said inflatable vehicle occupant protection device is a passenger air bag.

4. The apparatus as set forth in claim 1 wherein said inflatable vehicle occupant protection device is a driver air bag.

5. The apparatus as set forth in claim 1 wherein said diffuser plate includes a first planar flange portion extending away from said main body portion in a first direction and a second planar flange portion extending away from said main body portion in a direction opposite said first direction.

6. The apparatus as set forth in claim 5 wherein said first and second flange portions have openings for securing said diffuser plate between said inflation fluid source and said inflatable vehicle occupant protection device.

7. The apparatus as set forth in claim 5 wherein each of said first and second flange portions has tabs for securing a cover for said apparatus.

8. The apparatus as set forth in claim 7 wherein said tabs extend away from said main body portion on opposite sides of said diffuser plate.

9. The apparatus as set forth in claim 1 wherein each of said raised portions of said diffuser plate has end portions extending away from said main body portion and a middle portion connecting said end portions.

10. The apparatus as set forth in claim 9 wherein each of said middle portions of said raised portions has a radius of curvature corresponding to a radius of curvature of said main body portion.

11. The apparatus as set forth in claim 1 wherein said diffuser plate is molded as a single piece of plastic.

12. An apparatus for helping to protect an occupant of a vehicle, said apparatus comprising:

a diffuser plate; and an inflation fluid source extending along an axis and providing a flow of inflation fluid toward said diffuser plate;

said diffuser plate including a main body portion and a plurality of raised portions, each of said raised portions defining two curved slots for allowing inflation fluid to flow from said inflation fluid source through said diffuser plate and along a plane substantially parallel to said axis of said inflation fluid source and into an inflatable vehicle occupant protection device.

13. The apparatus as set forth in claim 12 wherein said main body portion of said diffuser plate has a predetermined radius of curvature and said curved slot also has said predetermined radius of curvature.

14. The apparatus as set forth in claim 12 wherein said diffuser plate includes a first planar flange portion extending away from said main body portion in a first direction and a second planar flange portion extending away from said main body portion in a direction opposite said first direction.

15. The apparatus as set forth in claim 14 wherein each of said first and second flange portions has tabs for securing a cover for said apparatus.

16. The apparatus as set forth in claim 15 wherein said tabs extend away from said main body portion in a first direction and curve such that said tabs extend in a second direction opposite said first direction.

17. The apparatus as set forth in claim 14 wherein said first and second flange portions include openings for receiving fastener assemblies to secure said diffuser plate in said apparatus.

18. The apparatus as set forth in claim 12 wherein said main body portion of said diffuser plate has a predetermined radius of curvature about a longitudinal axis, each of said raised portions of said diffuser plate having end portions extending radially away from said main body portion and a middle portion connecting said end portions.

19. The apparatus as set forth in claim 18 wherein each of said middle portions of said raised portions has said predetermined radius of curvature.

20. The apparatus as set forth in claim 12 wherein said diffuser plate has tabs for securing said diffuser plate to a cover for said apparatus, said tabs extending through slots in said cover.

* * * * *